(12) United States Patent
Lardinois

(10) Patent No.: US 6,914,157 B2
(45) Date of Patent: Jul. 5, 2005

(54) METHOD FOR OBTAINING AN AMMONIUM CARBAMATE SOLUTION FROM A GAS MIXTURE CONTAINING $NH_3$, $H_2O$ AND $CO_2$

(75) Inventor: Guillaume Mario Hubert Jozef Lardinois, Elsloo (NL)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 10/483,489

(22) PCT Filed: Jul. 3, 2002

(86) PCT No.: PCT/NL02/00433
§ 371 (c)(1),
(2), (4) Date: Jan. 13, 2004

(87) PCT Pub. No.: WO03/010089
PCT Pub. Date: Feb. 6, 2003

(65) Prior Publication Data
US 2004/0199013 A1 Oct. 7, 2004

(30) Foreign Application Priority Data
Jul. 24, 2001 (NL) .............................................. 1018624

(51) Int. Cl.[7] .......................... C07C 51/15; C07C 269/00

(52) U.S. Cl. ........................................ 562/550; 562/555
(58) Field of Search .................................. 562/550, 555

(56) References Cited

U.S. PATENT DOCUMENTS

| | | |
|---|---|---|
| 3,120,563 A | 2/1964 | Mathieu |
| 3,301,897 A | 1/1967 | Cook |
| 3,310,558 A | 3/1967 | Oele |
| 3,503,970 A | 3/1970 | Kazumichi et al. |
| 3,708,536 A | 1/1973 | Hillenbrand |
| 4,408,046 A | 10/1983 | Van Hardeveld |

FOREIGN PATENT DOCUMENTS

| | | |
|---|---|---|
| DE | 62 559 | 11/1966 |
| GB | 1129787 | 10/1968 |

*Primary Examiner*—Paul A. Zucker
(74) *Attorney, Agent, or Firm*—Mayer Brown Rowe & Maw LLP (57) ABSTRACT

The invention relates to a method for obtaining an ammonium carbamate solution from a gas mixture that contains more than 40 wt. % $NH_3$, less than 50 wt. % $CO_2$ and less than 40 wt. % $H_2O$ and has a pressure between 0.1 MPa and 4 MPa, comprising a compression step, in which the pressure of the gas mixture is increased to a pressure between 0.5 MPa and 25 MPa, and an absorption step.

15 Claims, 8 Drawing Sheets

METHOD FOR OBTAINING AN AMMONIUM CARBAMATE SOLUTION FROM A GAS MIXTURE CONTAINING NH₃, H₂O AND CO₂

CROSS REFERENCE TO RELATED APPLICATION

This application is the National Phase of International Application PCT/NL02/00433 filed Jul. 3, 2002 which designated the U.S., and that International Application was published under PCT Article 21(2) in English.

The invention relates to a method for obtaining an ammonium carbamate solution from a gas mixture containing $NH_3$, $H_2O$ and $CO_2$.

Such a method is applied in processes for the preparation of melamine, such as in the Stamicarbon process as described in 'Melamine and Guanamines', par. 4.1.3 of Ullmann's Encyclopedia of Industrial Chemistry, Sixth Edition, 2001 Electronic Release. In the known process the gas mixture is obtained from a cooling zone in which the melamine-containing flow coming from a reactor is cooled. The gas mixture, which has a pressure of approximately 0.7 MPa, is subsequently subjected to an absorption step in which, besides an ammonium carbamate solution, a flow of gaseous $NH_3$ is also obtained. An ammonium carbamate solution is here and hereafter understood to mean an aqueous solution that, besides ammonium carbamate, can also contain free $NH_3$ and/or $CO_2$ and/or other compounds derived from $NH_3$ and $CO_2$, such as ammonium bicarbonate.

The flow of gaseous $NH_3$ recovered from the absorption step is used elsewhere in the melamine production process, as fluidization gas in the reactor. The Stamicarbon process further comprises a heat exchanger in which the gas mixture is partially condensed before it is subjected to the absorption step.

In many cases the ammonium carbamate solution obtained from the gas mixture is processed further for use as a raw material for the preparation of urea. The preparation of urea from ammonia and carbon dioxide via ammonium carbamate takes place at an elevated pressure, usually between 12.5 MPa and 25 MPa, via the following reaction scheme.

The further processing of the ammonium carbamate solution in particular relates to the release from the solution of a part of the $NH_3$, which is then recycled within the melamine production process, and to the reduction of the quantity of water in the solution.

A disadvantage of known processes such as the Stamicarbon process is that the aforesaid further processing requires much energy in the form of steam. Moreover, the further processing is technically complicated, which means it can only be realized at very high costs.

The object of the invention is to largely eliminate the said disadvantage.

This object is achieved in that the gas mixture, which contains more than 40 wt. % $NH_3$ less than 50 wt. % $CO_2$ and less than 40 wt. % $H_2O$ and has a pressure between 0.1 MPa and 4 MPa, is compressed in a compression step prior to the absorption step, which involves increasing the pressure of the gas mixture to a pressure between 0.5 MPa and 25 MPa. Preferably the gas mixture has a pressure between 0.5 and 2.5 MPa before entering the compression step. The pressure of the gas mixture is increased in the compression step; preferably by at least 0.4 MPa, more preferably by at least 0.7 MPa. The pressure of the gas mixture is preferably increased to a pressure between 1 MPa and 5 MPa in the compression step, more preferably to a pressure between 1.5 MPa and 3 MPa, this in particular if the method according to the invention is incorporated in a process for the preparation of melamine. Alternatively, the pressure of the gas mixture is preferably increased to a pressure between 12.5 MPa and 25 MPa, this in particular if the method according to the invention is incorporated in a process for the preparation of urea.

Surprisingly, it has been found that in the method according to the invention the quantity of ammonia that is entrained via the ammonium carbamate solution, either as free ammonia or as ammonium ion, is lower than in the known method, so that no or at least less further processing is necessary. This advantage offsets the consumption of energy in the form of electricity or steam in the compression step.

A further advantage of the invention is that an ammonium carbamate solution, obtained from the gas mixture may contain a lower percentage of $H_2O$ at a higher pressure without an—undesirable—solid phase being formed. The method according to the invention can therefore be applied to gas mixtures with a $H_2O$ percentage that is so low that this would lead to problems due to the formation of solids in the known processes. The gas mixture preferably contains more than 50 wt. % $NH_3$, between 10 and 30 wt. % $CO_2$ and less than 35 wt. % $H_2O$. The ammonium carbamate solution obtained from the gas mixture preferably has more than 10 wt. % water in order to prevent solid phase formation, in particular when the pressure of the solution is below 3 MPa.

Yet another advantage of the invention is that, if the pressure in the compression step is increased up to approximately 1.5 MPa, preferably 1.8 MPa or still higher, such as for example 2 MPa or more, the flow of gaseous $NH_3$ obtained from the absorption step can wholly or partially be condensed in a simple way because the condensation temperature of $NH_3$ at the said pressures has increased to above the temperature level at which cooling water circuits in plants are usually operated.

Yet another advantage of the method according to the invention is that, if it is part of a process for the preparation of melamine in which the gas mixture is obtained at approximately the pressure of the reactor, it is not necessary to increase the pressure in the reactor to obtain the ammonium carbamate solution at a higher pressure. As a result, existing reactors for example do not need to be adapted, and new reactors can be of simpler and thus cheaper design.

The compression step, the aim of which is to increase the pressure of the gas mixture, can be carried out in any way known to one skilled in the art, for example by means of a compressor. On account of the corrosive character of any ammonium carbamate formed upon condensation, the temperature of the compressor components that come into contact with the gas mixture is preferably so high that no condensation occurs. This can be achieved by for example heating the compressor, or by returning a part of the gas mixture whose pressure, and thus temperature, has been increased to the compressor inlet. In addition it may be advantageous to install a separation device before the compressor to trap any drops of liquid that are present. It may further be necessary or desirable to carry out the compression step by arranging several compressors in series.

The absorption step comprises a treatment of an incoming flow, in this method according to the invention consisting of the gas mixture whose pressure has been increased, with liquid $NH_3$ and optionally water or an aqueous solution of for example $NH_3$, ammonium carbamate or urea. This results in the formation of an ammonium carbamate solution. The absorption step can be carried out in various ways known to one skilled in the art, for example in a packed column or in a plate column. In the absorption step the liquid $NH_3$ absorbs the $CO_2$ and the $H_2O$ from the gas mixture, so that an ammonium carbamate solution is formed. The $CO_2$ will afterwards be present in the ammonium carbamate solution, for example as carbamate ion. The liquid $NH_3$ can be obtained wholly or partially by condensation of a part of the flow of gaseous $NH_3$ obtained from the absorption step. If the quantity of $H_2O$ is so low that undesired formation of solids can take place, it is advantageous to feed water or an aqueous solution of, for example, $NH_3$, ammonium carbamate or urea.

In order to be able to carry out the absorption step in an efficient way it is advantageous when the flow that enters the absorption step has a dew point between 65° C. and 140° C. More preferably the dew point lies between 80° C. and 110° C.

In a preferred embodiment, a first partial condensation step is also done, in which the gas mixture is converted into a gas/liquid mixture. The first partial condensation step can be carried out after the first compression step. The first partial condensation step should be carried out prior to the absorption step. The first partial condensation step can be carried out in a way known to one skilled in the art, for example by means of a heat exchanger that cools the gas mixture so that it is partially condensed. During the first partial condensation step, already much of the gaseous $CO_2$ present enters the liquid phase, via the formation of for example ammonium carbamate in aqueous solution. The quantity of gaseous $CO_2$ that enters the absorption step is therefore lower compared to the embodiment not comprising the first partial condensation step, so that the flow of gaseous $NH_3$ is obtained more efficiently from the absorption step, which implies that less liquid $NH_3$ is required and/or a higher throughput is possible.

The said further processing of the ammonium carbamate solution to reduce its water content is technically complicated, comprises many process steps and is therefore expensive. For this reason it is a further objective of the invention to provide a method that can obviate the need for said further processing, because a concentrated ammonium carbamate solution is obtained from a gas mixture containing $NH_3$, $H_2O$ and $CO_2$ that can be used in the production of urea without further processing to reduce its water content. In this context concentrated means that the mass flow of $H_2O$ has been substantially lowered compared to the gas mixture; preferably the mass flow of $H_2O$ is reduced by more than 25 w %. This method comprises:

a first partial condensation step, in which the gas mixture is converted into a gas/liquid mixture;

a first separation step, in which the gas/liquid mixture is separated into an ammonium carbamate recycle solution and a concentrated gas mixture, which contains more than 60 wt. % $NH_3$, less than 30 wt. % $CO_2$ and less than 10 wt. % $H_2O$;

an absorption step, with at least one of the following two mixtures:

the gas mixture the concentrated gas mixture being compressed to a pressure between 0.5 MPa and 7.5 MPa in a compression step.

In the first partial condensation step more water than $NH_3$ or $CO_2$ is condensed. Upon condensation, ammonium carbamate in solution is formed. It is an advantage of the method according to the invention that the water content in the concentrated gas mixture can be reduced to such an extent that the concentrated ammonium carbamate solution subsequently obtained from the absorption step can directly be applied in the production of urea. The liquid flow recovered from the first separation step according to the invention is defined here and hereafter as an ammonium carbamate recycle solution. If the method is applied in a process for the preparation of melamine it is advantageous to use the ammonium carbamate recycle solution as a direct coolant for cooling of the flow leaving the reactor. This has the advantage that the presence of ammonium carbamate during cooling can prevent undesirable reactions of melamine to form compounds such as ammeline and ammelide.

The first partial condensation step can be carried out in a way known to one skilled in the art, for example by means of a heat exchanger that cools the gas mixture so that it is partially condensed.

The aim of the first separation step is to separate the liquid present after the first partial condensation step from the gas phase. The first separation step can be carried out in a way known to one skilled in the art. It is possible, for example, to combine the first separation step with the first partial condensation step, for example in a heat exchanger constructed so that the liquid phase can be collected and can be separated. It is also possible to carry out the first separation step in a so-called knockout drum. This a vessel in which gravity is used to carry out the first separation step: The gas/liquid mixture is fed to the knock-out drum, after which the liquid flows down along the wall and is thence removed and the gas is removed from the middle of the vessel via the top.

As indicated above, the gas mixture and/or the concentrated gas mixture is subjected to the compression step. In a preferred embodiment the gas mixture is compressed. The compression step also leads to an increase in the temperature of the gas mixture. This has the advantage that the first partial condensation step can be carried out at an elevated temperature, so that higher-quality steam can be generated from the heat released during condensation. More preferably the concentrated gaseous mixture is then subjected to a second partial condensation after the first separation step, in which a second gas/liquid mixture is formed as feedflow for the absorption step. During the second partial condensation step already much of the $CO_2$ present has entered the liquid phase, via the formation of for example ammonium carbamate. The quantity of gaseous $CO_2$ that enters the absorption step is therefore lower, so that the flow of gaseous $NH_3$ is obtained more efficiently from the absorption step, which implies that less liquid $NH_3$ is required and/or a higher throughput is possible. Even more preferably a second separation step is added to this embodiment, in which step, carried out between the second partial condensation step and the absorption step, a first concentrated ammonium carbamate solution is separated from the second gas/liquid mixture. The advantage of this is that a smaller flow goes to the absorption step, reducing the load on the absorption step. A further advantage of this embodiment is that the composition of the first concentrated ammonium carbamate solution differs somewhat from that of the concentrated ammonium carbamate solution recovered from the absorption step, so that these two solutions can be used for different purposes. If desired the two concentrated ammonium carbamate solutions can also be combined for further processing.

In another preferred embodiment according to the invention it is not, as described above, the gas mixture that is subjected to the compression step, so prior to the first partial condensation step and the first separation step, but the concentrated gas mixture leaving the first separation step. As a result the flow that enters the compression step is smaller than when the gas mixture is already subjected to the compression step, the ammonium carbamate recyclate solution already having been separated. More preferably the concentrated gaseous mixture is then subjected to a second partial condensation step between the compression step and the absorption step, resulting in the formation of a second gas/liquid mixture as feed flow for the absorption step. As described above it is advantageous when, as a consequence of the second partial condensation step, much of the $CO_2$ present has already entered the liquid phase, via the formation of for example ammonium carbamate. This results in a lower quantity of gaseous $CO_2$ entering the absorption step, so that the flow of gaseous $NH_3$ can be obtained from the absorption step in a more efficient way, which implies that less liquid $NH_3$ is required and/or a higher throughput is possible. In addition the heat released in this second partial condensation step can be used to supply steam. Even more preferably a second separation step is added to this embodiment, carried out between the second partial condensation step and the absorption step, in which a first concentrated ammonium carbamate solution is separated from the second gas/liquid mixture. The advantage hereof, as described above, is that a smaller flow goes to the absorption step, reducing the load on this step. A further advantage of this embodiment is that the composition of the first concentrated ammonium carbamate solution differs somewhat from that of the concentrated ammonium carbamate solution recovered from the absorption step, so that these two solutions can be used for different purposes. It is of course also possible for the two concentrated ammonium carbamate solutions to be combined for further processing. It may be advantageous to additionally, and prior to the first partial condensation step, increase the pressure of the gas mixture to between 0.3 MPa and 7.5 MPa in a precompression step. This is particularly advantageous if this method according to the invention is part of a process for the preparation of melamine in which the reactor is operated at a low pressure, for example atmospheric pressure.

When applying those embodiments of the method according to the invention in which a concentrated ammonium carbamate solution is obtained, this solution generally contains between 25 and 50 wt. % $NH_3$, between 25 and 50 wt. % $CO_2$ and between 1 and 30 wt. % $H_2O$. From the gas mixture then a quantity of water has been removed which, as stated earlier, is particularly advantageous if the concentrated ammonium carbamate solution is used for the preparation of urea. In addition, gaseous $NH_3$ has been recovered from the gas mixture, which can be put to any desired use. The gaseous $NH_3$ can for example, if the method according to the invention is applied to a gas mixture obtained in a process for the production of melamine, be fed to the melamine reactor to serve as fluidization gas.

The industrial applicability of the present invention is, as indicated earlier, not limited to incorporation in processes for the preparation of melamine. In particular, incorporation in processes for the preparation of urea is foreseen. For example, in conventional processes for the preparation of urea, gas mixtures are present from which an ammonium carbamate solution should be obtained. Conventional urea processes are understood to be those processes where the effluent of the synthesis zone is reduced in pressure prior to the execution of subsequent process steps such as separation of unreacted $NH_3$ and $CO_2$ and/or decomposition of ammonium carbamate.

If the present invention is applied to a process for the preparation of urea, the gas mixture is preferably raised to a pressure at or slightly above the pressure in the urea synthesis zone, i.e. to a pressure between 12.5 MPa and 25 MPa, more preferably to a pressure between 14 MPa and 22 MPa. The advantage of this is that the water content of the stream returning to the urea synthesis zone is reduced, leading to a higher conversion rate in the synthesis zone as a result of which the recovery of unreacted components can be achieved by a reduced technical effort (i.e. reduced heat or steam consumption, reduced stripping agent consumption).

The method according to the invention is explained on the basis of the following drawings.

The first digit of the numbers in the figures is the same as the number of the figure. If the last two digits of the numbers of different figures are the same, they refer to the same element.

Figure 1:
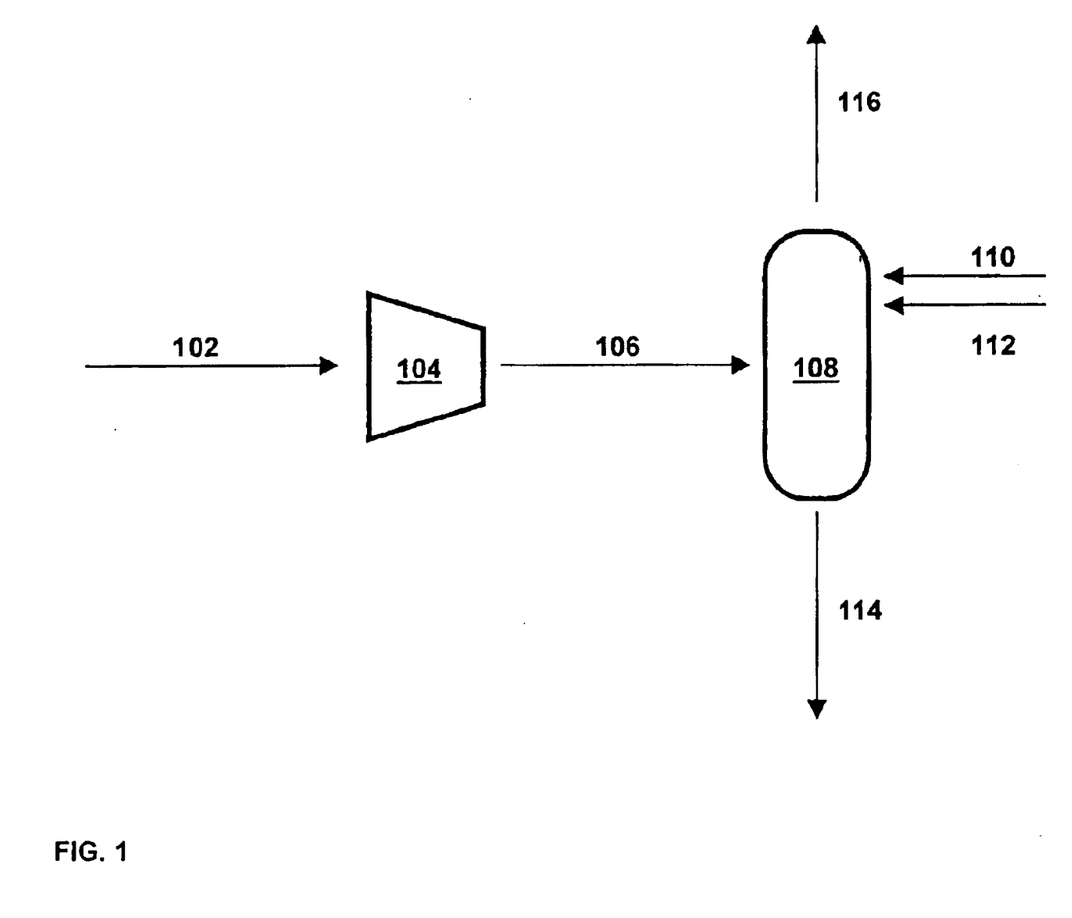
FIG. 1 shows an embodiment with a compression step, followed by an absorption step.

In FIG. 1 the gas mixture, which for example comes from the cooling zone of a process for the preparation of melamine, is fed via line 102 to compressor 104. The gas mixture of which the pressure has been increased is then fed via line 106 to absorber 108. Absorber 108 also receives liquid ammonia via line 110 and water or an aqueous solution of for example ammonium carbamate via line 112. Lines 110 and 112 can optionally be combined to form one line. Via line 114 the ammonium carbamate solution leaves absorber 108 and via line 116 the flow of gaseous $NH_3$.

Figure 2:
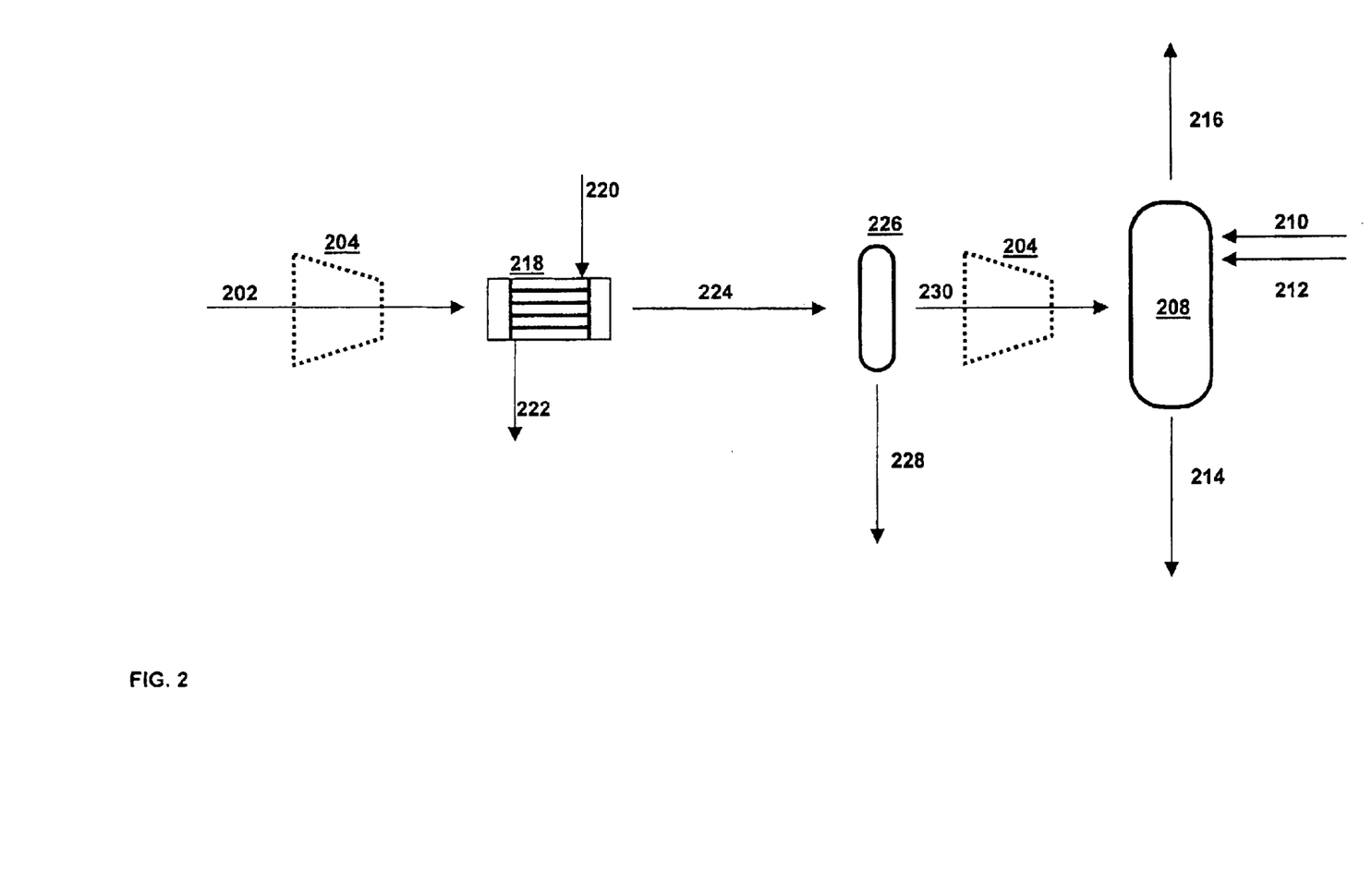
FIG. 2 an embodiment with a first partial condensation step and a separation step, with a compression step taking place either prior to the first partial condensation step or between the separation step and the absorption step.

FIG. 2 shows condenser 218, in which the gas mixture is subjected to the first partial condensation step. A coolant, for example water, is supplied via line 220 and removed via line 222. The gas/liquid mixture then goes via line 224 to separator 226. From separator 226 on the one hand the ammonium carbamate recyclate solution is obtained via line 228, while on the other hand the concentrated gas mixture becomes available that goes via line 230, to absorber 208, which further operates as described under FIG. 1. It is possible for condenser 218 and separator 226 to be combined into one apparatus. In FIG. 2, two possible locations for compressor 204 are shown by means of dotted lines: either upstream of condenser 218, so that the gas mixture supplied via line 202 is subjected to the compression step, or upstream of absorber 208, so that the concentrated gas mixture coming from separator 226 is subjected to the compression step.

Figure 3:
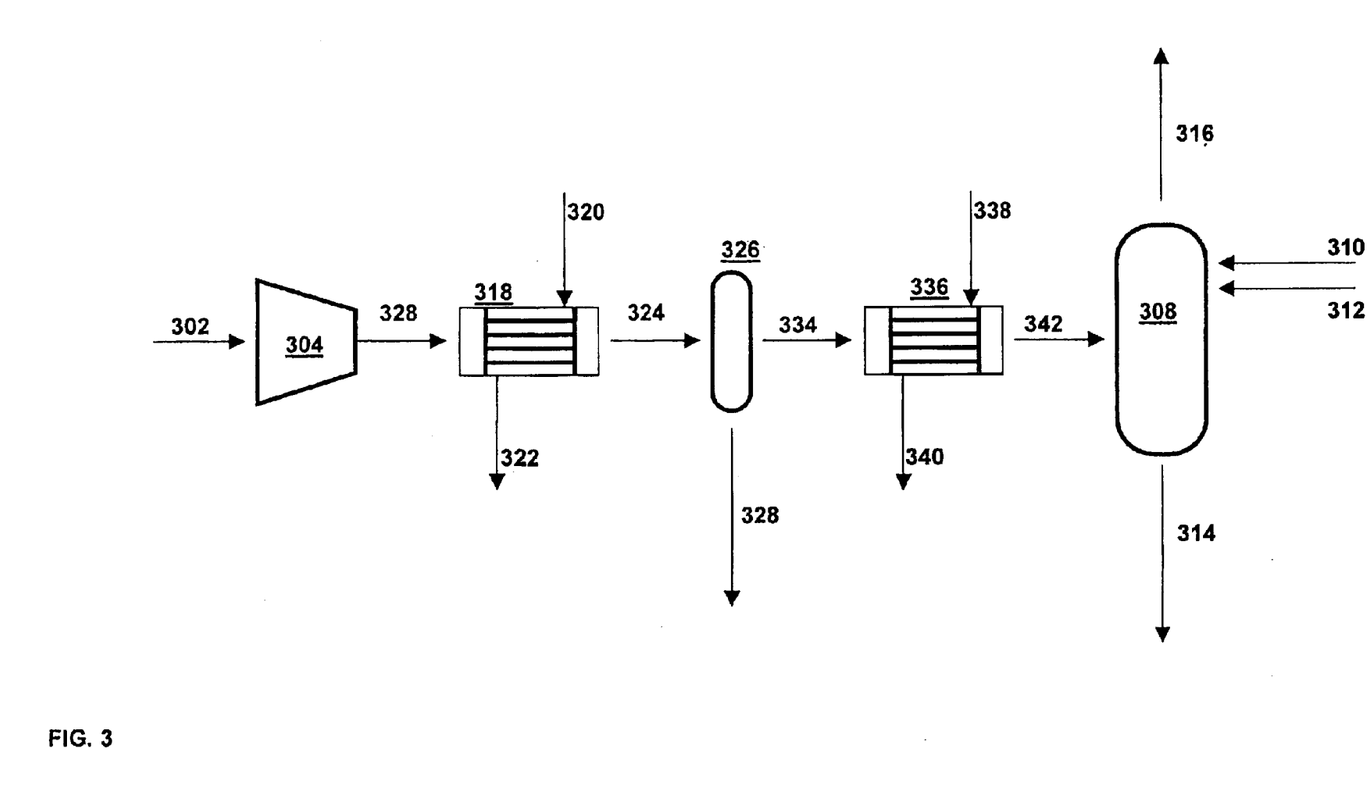
FIG. 3 an embodiment in which, besides a compression step, a first partial condensation step, a separation step and an absorption step, also a second partial condensation step takes place, this step being carried out between the first separation step and the absorption step.

FIG. 3 shows an embodiment in which the gas mixture entering compressor 304 via line 302 is subjected to the compression step, after which the gas mixture of which the pressure has been increased enters, via line 328, condenser 318, where the first partial condensation takes place. The gas/liquid mixture then goes via line 324 to separator 326. The concentrated gas mixture leaving separator 326 is fed via line 334 to a next condenser 336, in which the second partial condensation step takes place. Condenser 336 is cooled by means of a coolant, for example water, that is supplied via line 338 and removed via line 340. The second gas/liquid mixture is then fed via line 342 to absorber 308.

Figure 4:
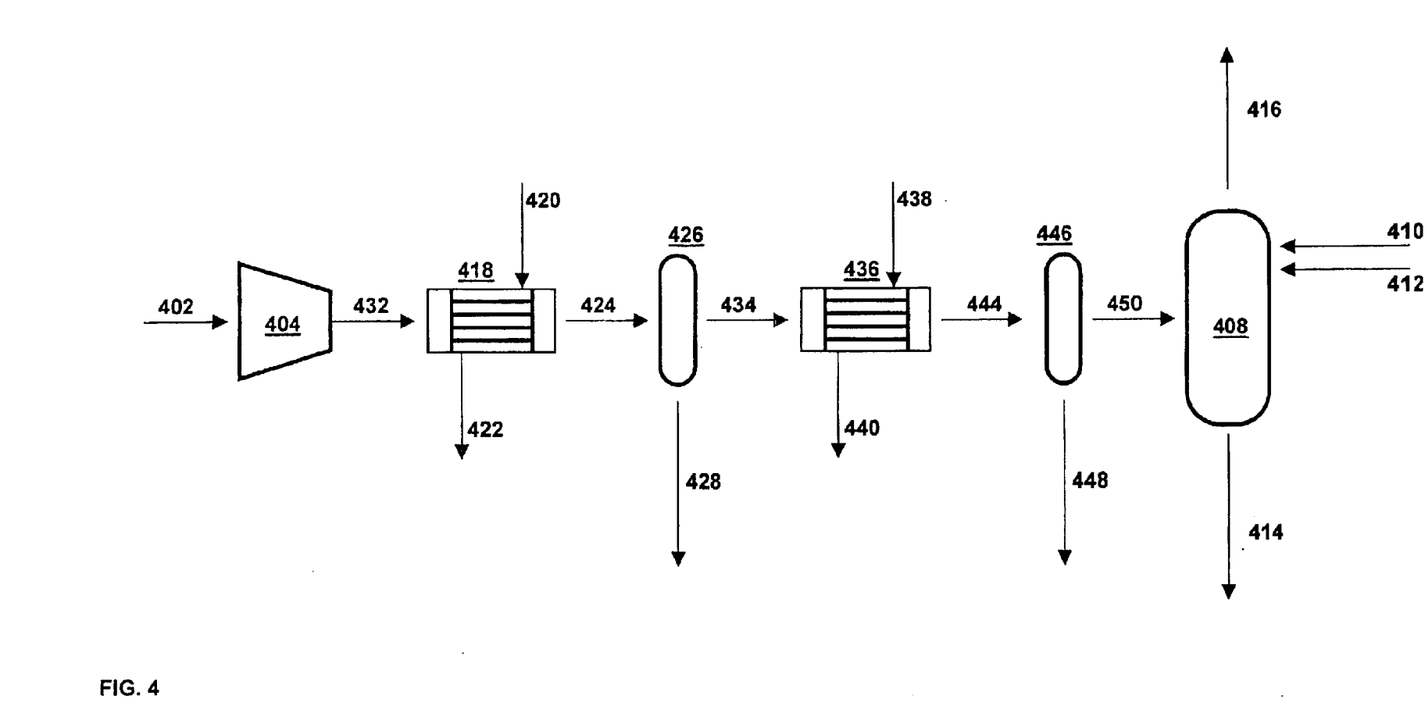
FIG. 4 an embodiment in which, compared with FIG. 3, a second separation step has been added, between the second partial condensation step and the absorption step.

FIG. 4 builds on the embodiment of FIG. 3 by feeding the second gas/liquid mixture, after the second partial condensation step, carried out in condenser 436, via line 444 to separator 446, in which the second separation step is carried out. The first concentrated ammonium carbamate solution leaves separator 446 via line 448, after which the remaining flow is fed via line 450 to absorber 408.

Figure 5:
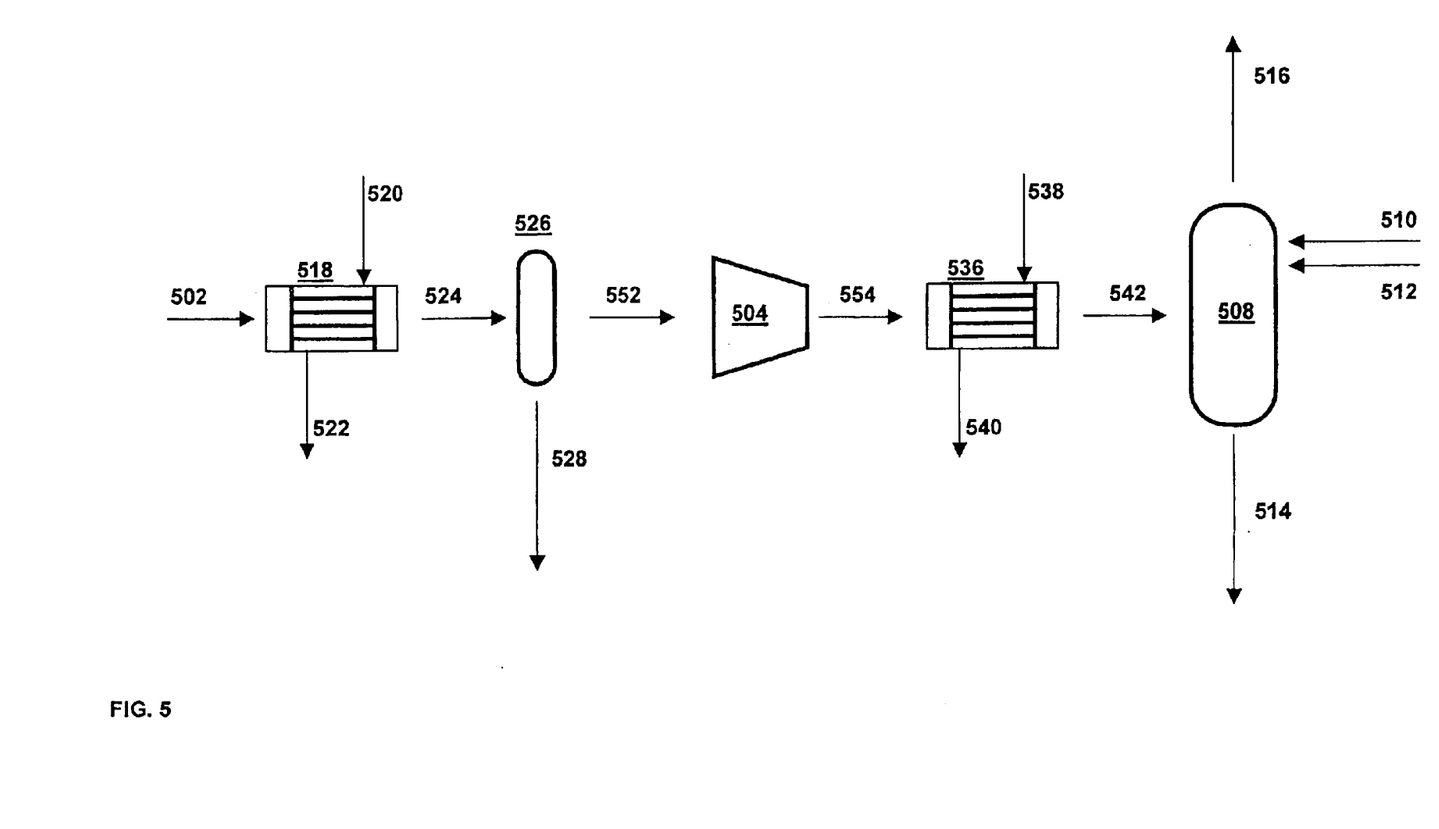
FIG. 5 an embodiment in which, compared with FIG. 3, the compression step is carried out after the separation step.

The method as shown in FIG. 5 builds on that of FIG. 2; in this case compressor 504 is installed downstream of the first partial condensation step (in condenser 518) and the first separation step (in separator 526). The compressor is fed with the concentrated gas mixture via line 552. The compressed flow from compressor 504 is fed via line 554 to condenser 536; here the second partial condensation step takes place. The second gas/liquid mixture is then fed via line 542 to absorber 508.

Figure 6:
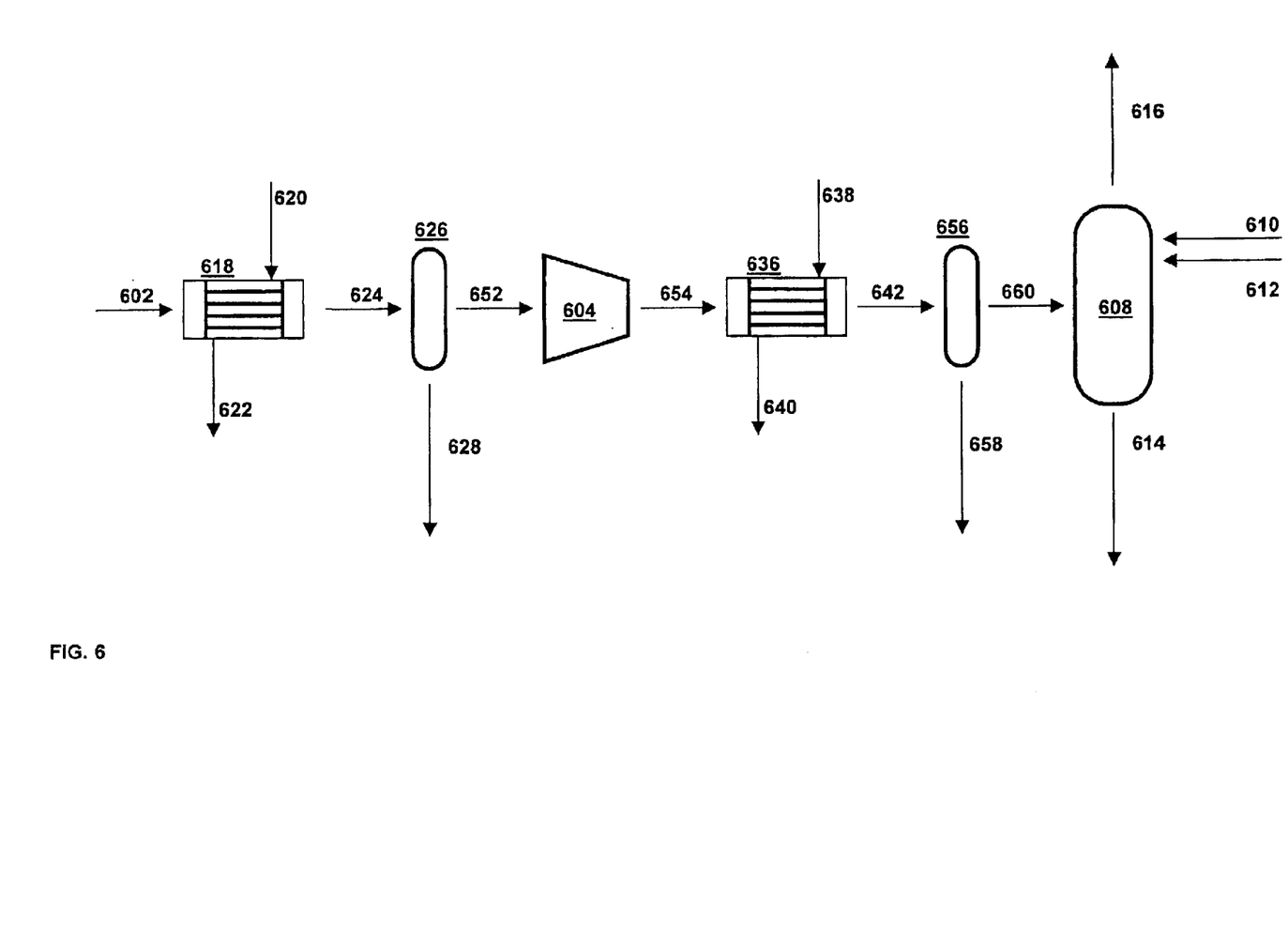
FIG. 6 an embodiment in which, compared with FIG. 5, a second separation step has been added, which is carried out between the second partial condensation step and the absorption step.

FIG. 6 shows how the design as shown in FIG. 5 can be extended further according to the invention by installing second separator 656, in which the second separation step takes place. Second separator 656 is fed via line 642 with the second gas/liquid mixture. The second gas/liquid mixture is separated into the first concentrated ammonium carbamate solution, which is removed via line 658, and a strongly concentrated gas mixture, which is fed to absorber 608 via line 660.

Figure 7:
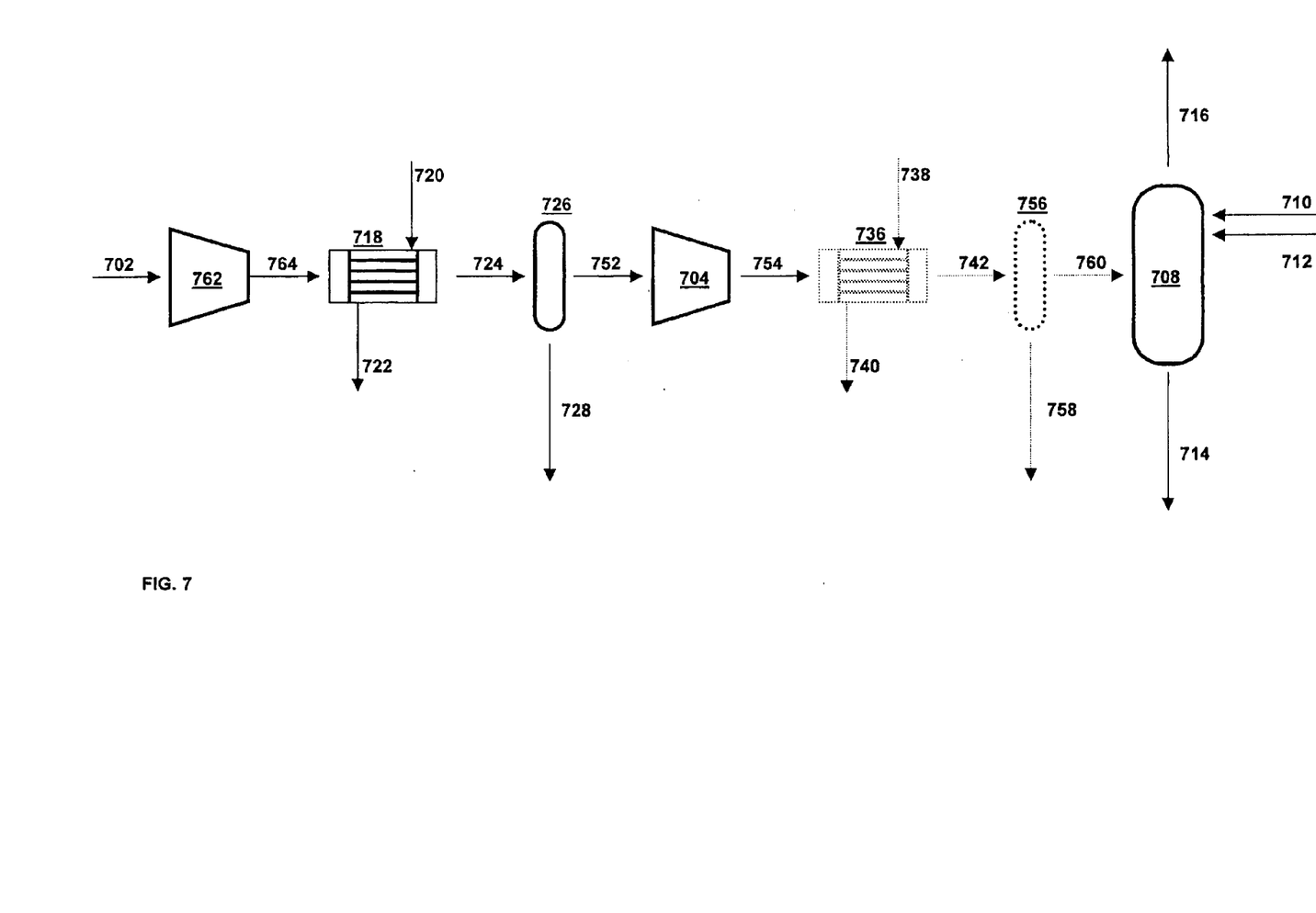
FIG. 7 an embodiment in which the gas mixture is subjected to a precompression step, followed by either a first partial condensation step, separation step, compression step and absorption step, or a series of process steps as in FIG. 6.

FIG. 7 shows the situation in which a precompression step is carried out in compressor 762, after which the precompressed gas mixture is fed via line 764 to condenser 718, where the first partial condensation step is carried out. The compression step itself then follows after the first partial condensation step and the first separation step (carried out in separator 726). Optionally, and indicated by dotted lines, a second partial condensation can still be carried out in condenser 736 and afterwards optionally a second separation in separator 756 before the absorption step takes place in absorber 708.

Below, the invention is elucidated on the basis of the following example, with also a comparative experiment being given.

EXAMPLE I

In Example I use is made of the configuration as shown in FIG. 5. The compositions of the various flows are shown in Table 1.

TABLE 1

| | Flow | | | | | | | | | |
|---|---|---|---|---|---|---|---|---|---|---|
| | 502 | 524 | 552 | 528 | 554 | 542 | 514 | 510 | 512 | 516 |
| $NH_3$ (wt. %) | 63 | 63 | 74 | 36 | 74 | 74 | 41 | 100 | 0 | 100 |
| $CO_2$ (wt. %) | 18 | 18 | 17 | 20 | 17 | 17 | 39 | 0 | 0 | 0 |
| $H_2O$ (wt. %) | 19 | 19 | 9 | 44 | 9 | 9 | 20 | 0 | 100 | 0 |
| T [° C.] | 111 | 70 | 70 | 70 | 215 | 105 | 100 | 45 | 33 | 45 |
| P [MPa] | 0.6 | 0.6 | 0.6 | 0.6 | 2 | 2 | 2 | 2 | 2 | 2 |
| Wt. % gas | 100 | 71 | 100 | 0 | 100 | 55 | 0 | 0 | 0 | 100 |
| Total [t/h] | 86 | 86 | 61 | 25 | 61 | 61 | 28 | 12 | 0.5 | 45 |

Comparative Experiment A

Figure 8:
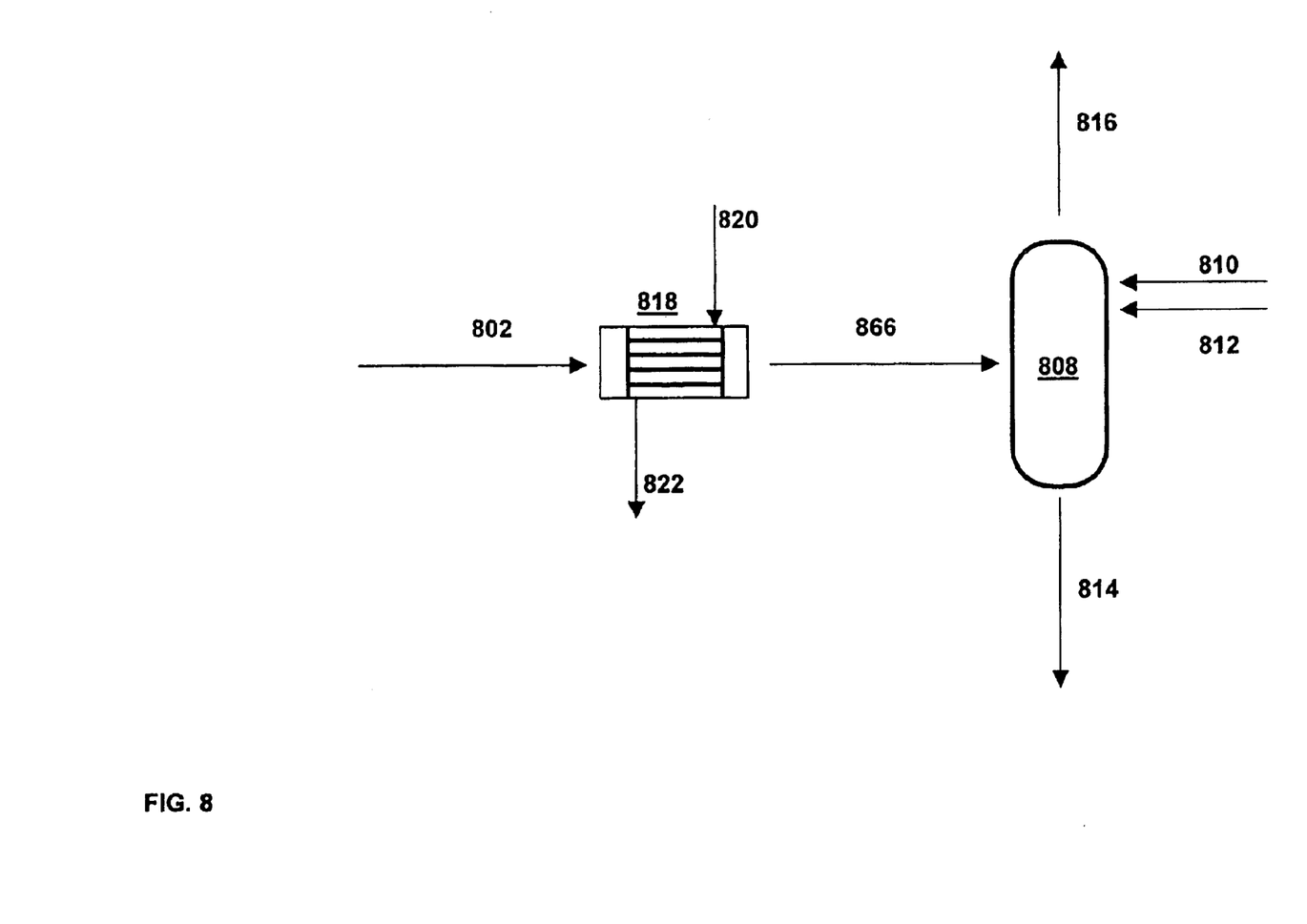
FIG. 8 an embodiment according to the prior art.

See FIG. 8. In comparative experiment A a gas mixture is fed via line 802 to condenser 818, where partial condensation takes place. The gas/liquid mixture coming from condenser 818 is fed via line 866 to absorber 808. Flows 802 and 866 are not subjected to a compression step. Absorber 808 also receives a liquid $NH_3$ flow via line 810 and an aqueous flow via line 812. An ammonium carbamate solution and a gaseous $NH_3$ flow leave absorber 808, via line 814 and line 816, respectively. Compositions of the said flows are given in Table 2 below.

TABLE 2

| | Flow | | | | | |
|---|---|---|---|---|---|---|
| | 802 | 866 | 814 | 810 | 812 | 816 |
| $NH_3$ (wt. %) | 59 | 59 | 36 | 100 | 0 | 100 |
| $CO_2$ (wt. %) | 13 | 13 | 19 | 0 | 0 | 0 |
| $H_2O$ (wt. %) | 28 | 28 | 45 | 0 | 100 | 0 |
| T [° C.] | 119 | 73 | 72 | 45 | 33 | 5 |
| P [MPa] | 0.6 | 0.6 | 0.6 | 2 | 0.6 | 0.6 |
| Wt. % gas | 100 | 46 | 0 | 0 | 0 | 100 |
| Total [t/h] | 81 | 81 | 53 | 12 | 1 | 41 |

As is evident from Example I and Comparative experiment A the concentrated ammonium carbamate solution 514 of Example 1 contains less ammonia (approx. 11 t/h, or 41 wt. % of 28 t/h) than the ammonium carbamate solution 814 of Comparative experiment A (approx. 19 t/h, or 36 wt. % of 53 t/h), despite the fact that flow 802 in the comparative experiment has a somewhat lower initial ammonia concentration (59 wt. % versus. 63 wt. % for flow 502). In addition the concentrated ammonium carbamate solution 514 of Example 1 contains a lower percentage of water (20 wt. %, almost 6 t/h) than the ammonium carbamate solution 814 of Comparative experiment A (45 wt. %, almost 24 t/h). As a result, the concentrated ammonium carbamate solution 514 can be used without further processing to reduce its water content in the preparation of urea, which is not possible in an efficient way for ammonium carbamate solution 814.

What is claimed is:

1. Method for obtaining an ammonium carbamate solution from a gas mixture that contains more than 40 wt % $NH_3$, less than 50 wt % $CO_2$ and less than 40 wt % $H_2O$ and has a pressure between 0.1 MPa and 4 MPa, comprising a compression step in which the pressure of the gas mixture is increased to a pressure between 0.5 MPa and 25 MPa, followed by a first partial condensation step, in which the gas mixture is converted into a gas/liquid mixture, which is followed by an absorption step.

2. Method according to claim 1, further comprising, a separation step after the compression step and prior to the absorption step, in which the gas/liquid mixture is separated into an ammonium carbamate recyclate solution and a concentrated gas mixture that contains more than 60 wt % $NH_3$, less than 30 wt % $CO_2$ and less than 10 wt % $H_2O$;

wherein the absorption step is carried out with at least one of the following two mixtures being compressed in the compression step to a pressure between 0.5 MPa and 25 MPa:

the gas mixture and/or the concentrated gas mixture.

3. Method according to claim 2, in which the gas mixture is compressed.

4. Method according to claim 3, in which after the first separation step the concentrated gaseous mixture is subjected to a second partial condensation step in which a second gas/liquid mixture is formed as feed flow for the absorption step.

5. Method according to claim 4, in which a first concentrated ammonium carbamate solution is separated from the second gas/liquid mixture in a second separation step, carried out between the second partial condensation step and the absorption step.

6. Method according to claim 2, in which the compression step is carried out after the first separation step.

7. Method according to claim 6, in which the concentrated gaseous mixture is subjected to a second partial condensation step, carried out between the compression step and the absorption step, in which a second gas/liquid mixture is formed as feed flow for the absorption step.

8. Method according to claim 7, in which a first concentrated ammonium carbamate solution is separated from the second gas/liquid mixture in a second separation step, carried out between the second partial condensation step and the absorption step.

9. Method according to claim 6, in which, prior to the first partial condensation step, the pressure of the gas mixture is increased to between 0.3 MPa and 7.5 MPa in a precompression step.

10. Method according to claim 2, in which the concentrated ammonium carbamate solution comprises between 25 and 50 wt. wt % $NH_3$, between 25 and 50 wt % $CO_2$ and between 1 and 30 wt % $H_2O$.

11. Method according to claim 1, in which the gas mixture has been obtained in a process for the production of melamine.

12. Method according to claim 1, in which the gas mixture has been obtained in a process for the production of urea.

13. Method according to claim 1, which comprises absorbing the gas/liquid mixture to form an ammonium carbamate solution comprising more than 10 wt % water.

14. Method for obtaining an ammonium carbamate solution from a gas mixture comprising $NH_3$, $CO_2$ and $H_2O$, wherein the amount of $NH_3$ is more than 40 wt %, the amount of $CO_2$ is less than 50 wt %, and the amount of $H_2O$ present is less than 40 wt % and said mixture having a pressure between 0.1 MPa and 4 MPa, said method comprising compressing said gas mixture to a pressure between 0.5 MPa and 25 MPa in a compressor wherein the temperature of the components of the compressor that come into contact with the gas mixture is such that no condensation of the gas mixture occurs during compression, thereby obtaining a compressed gas mixture, partially condensing the compressed gas mixture, to form a gas/liquid mixture, and absorbing the gas/liquid mixture to form an ammonium carbamate solution.

15. Method for obtaining an ammonium carbamate solution from a gas mixture comprising more than 40 wt % $NH_3$, less than 50 wt % $CO_2$ and less than 40 wt % $H_2O$ and having a pressure between 0.1 MPa and 4 MPa, said method comprising separating any liquid present in the gas mixture; compressing said gas mixture from which any liquid has been removed to a pressure between 0.5 MPa and 25 MPa, thereby obtaining a compressed gas mixture free from liquid, partially condensing the compressed gas mixture to form a gas/liquid mixture, and absorbing the gas/liquid mixture to form an ammonium carbamate solution, comprising more than 10 wt % water.

* * * * *